United States Patent
Micak et al.

(10) Patent No.: US 7,152,415 B2
(45) Date of Patent: Dec. 26, 2006

(54) REFRIGERATED COMPARTMENT WITH CONTROLLER TO PLACE REFRIGERATION SYSTEM IN SLEEP-MODE

(75) Inventors: Michael Micak, Fullerton, CA (US); David A. Wightman, Arlington Heights, IL (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 75 days.

(21) Appl. No.: 10/803,766

(22) Filed: Mar. 18, 2004

(65) Prior Publication Data

US 2005/0204757 A1 Sep. 22, 2005

(51) Int. Cl.
*G05D 23/32* (2006.01)
*F25D 29/00* (2006.01)
*F25B 19/00* (2006.01)

(52) U.S. Cl. .......................... 62/157; 62/158; 62/161; 62/162; 62/231

(58) Field of Classification Search ................ 62/131, 62/157, 158, 231, 186, 161, 162; 236/51
See application file for complete search history.

(56) References Cited

U.S. PATENT DOCUMENTS

| | | | |
|---|---|---|---|
| 3,960,206 A | 6/1976 | Baxter et al. | |
| 3,960,322 A | 6/1976 | Ruff et al. | |
| 4,028,736 A | 6/1977 | Willson et al. | |
| RE29,966 E | 4/1979 | Nussbaum | |
| 4,152,902 A | 5/1979 | Lush | |
| 4,193,781 A | 3/1980 | Vogel et al. | |
| 4,197,716 A | 4/1980 | Nussbaum | |
| 4,270,361 A | 6/1981 | La Barge | |
| 4,272,012 A | 6/1981 | Molnar et al. | |
| 4,292,813 A | 10/1981 | Paddock | |
| 4,321,069 A | 3/1982 | Ritter | |
| 4,344,294 A | 8/1982 | Gelbard | |
| 4,361,418 A | 11/1982 | Tscheppe | |
| 4,373,663 A | 2/1983 | Hammer | |
| 4,437,317 A | 3/1984 | Ibrahim | |
| 4,459,824 A | 7/1984 | Krueger | |
| 4,467,999 A | 8/1984 | Ritter | |
| 4,494,598 A | 1/1985 | DeHaan | |
| 4,537,038 A | 8/1985 | Alsenz | |
| 4,550,574 A | 11/1985 | Hohman | |
| 4,591,967 A | 5/1986 | Mattes | |
| 4,602,484 A | 7/1986 | Bendikson | |
| 4,630,450 A | 12/1986 | Clarke | |
| 4,646,529 A | 3/1987 | Hanson | |
| 4,653,466 A | 3/1987 | DeHaan | |
| 4,694,890 A | 9/1987 | Zarate | |
| 4,718,246 A | 1/1988 | Mitchell | |
| 4,735,054 A | 4/1988 | Beckey | |
| 4,735,059 A | 4/1988 | O'Neal | |

(Continued)

OTHER PUBLICATIONS

International Search Report dated Sep. 14, 2005.

*Primary Examiner*—Marc Norman
(74) *Attorney, Agent, or Firm*—Carlson, Gaskey & Olds

(57) ABSTRACT

A refrigeration system is employed to cool a refrigerated compartment in a kitchen or restaurant. An electronic refrigeration controller controls various aspects of the refrigerated compartment, including temperature. When a push button is pressed, a "sleep-mode" is activated to safely shut the refrigeration system down and turn the evaporator fan off. An employee can then stock or remove inventory from the refrigerated compartment without cool air blowing on the employee. After a predetermined amount of time, the sleep-mode ends and cool air blows into the refrigerated compartment.

25 Claims, 3 Drawing Sheets

U.S. PATENT DOCUMENTS

| | | | | |
|---|---|---|---|---|
| 4,750,332 | A | 6/1988 | Jenski | |
| 4,780,861 | A | 10/1988 | Stembridge | |
| 4,798,232 | A | 1/1989 | Stembridge | |
| 4,817,689 | A | 4/1989 | Stembridge | |
| 4,819,587 | A | 4/1989 | Tsutsui | |
| 4,835,981 | A | 6/1989 | Rinholen | |
| 4,879,879 | A | 11/1989 | Marsala | |
| 4,883,100 | A | 11/1989 | Stembridge | |
| 4,890,651 | A | 1/1990 | Stembridge | |
| 4,894,643 | A * | 1/1990 | Thompson et al. | 340/593 |
| 4,922,861 | A | 5/1990 | Tsutsui | |
| 4,944,335 | A | 7/1990 | Stembridge | |
| 4,944,336 | A | 7/1990 | Stembridge | |
| 4,947,653 | A | 8/1990 | Day | |
| 4,961,456 | A | 10/1990 | Stembridge | |
| 4,993,233 | A | 2/1991 | Borton | |
| 5,013,990 | A | 5/1991 | Weber | |
| 5,025,634 | A | 6/1991 | Dressler | |
| 5,036,892 | A | 8/1991 | Stembridge | |
| 5,042,263 | A | 8/1991 | Day | |
| 5,065,587 | A | 11/1991 | Howland et al. | |
| 5,129,237 | A | 7/1992 | Day | |
| 5,167,491 | A | 12/1992 | Keller | |
| 5,193,353 | A | 3/1993 | Brendel et al. | |
| 5,201,190 | A | 4/1993 | Nelson et al. | |
| 5,205,131 | A | 4/1993 | Powlas | |
| 5,239,834 | A | 8/1993 | Travers | |
| 5,263,332 | A * | 11/1993 | Park | 62/157 |
| 5,303,562 | A | 4/1994 | Bahel et al. | |
| 5,319,943 | A | 6/1994 | Bahel et al. | |
| 5,375,428 | A | 12/1994 | LeClear et al. | |
| 5,381,669 | A | 1/1995 | Bahel et al. | |
| 5,410,230 | A | 4/1995 | Bessler et al. | |
| 5,412,303 | A | 5/1995 | Wernicki | |
| 5,426,620 | A | 6/1995 | Budney | |
| 5,451,930 | A * | 9/1995 | McDaniel | 340/521 |
| 5,460,006 | A * | 10/1995 | Torimitsu | 62/127 |
| 5,463,874 | A | 11/1995 | Farr | |
| 5,475,986 | A | 12/1995 | Bahel et al. | |
| 5,537,834 | A | 7/1996 | Farr | |
| 5,557,938 | A | 9/1996 | Hanson et al. | |
| 5,687,139 | A | 11/1997 | Budney | |
| 5,787,723 | A | 8/1998 | Mueller et al. | |
| 5,813,242 | A | 9/1998 | Lawrence et al. | |
| 5,824,207 | A | 10/1998 | Lyapin et al. | |
| 5,831,851 | A | 11/1998 | Eastburn et al. | |
| 5,875,638 | A | 3/1999 | Tinsler | |
| 5,911,289 | A | 6/1999 | Waller | |
| 5,921,092 | A | 7/1999 | Behr et al. | |
| 5,941,081 | A | 8/1999 | Burgener | |
| 5,953,925 | A | 9/1999 | Mueller et al. | |
| 5,960,639 | A | 10/1999 | Hammer | |
| 6,047,557 | A | 4/2000 | Pham et al. | |
| 6,134,907 | A | 10/2000 | Mueller et al. | |
| 6,145,324 | A | 11/2000 | Dolezal | |
| 6,170,268 | B1 | 1/2001 | Elfert et al. | |
| 6,205,798 | B1 | 3/2001 | Porter et al. | |
| 6,233,952 | B1 | 5/2001 | Porter et al. | |
| 6,342,840 | B1 | 1/2002 | Dunn | |
| 6,343,477 | B1 | 2/2002 | Mandel et al. | |
| 6,393,852 | B1 | 5/2002 | Pham et al. | |
| 6,401,466 | B1 * | 6/2002 | Olsen | 62/131 |
| 6,408,635 | B1 | 6/2002 | Pham et al. | |
| 6,438,974 | B1 | 8/2002 | Pham et al. | |
| 6,449,972 | B1 | 9/2002 | Pham et al. | |
| 6,449,980 | B1 | 9/2002 | Minister | |
| 6,463,752 | B1 | 10/2002 | Mandel et al. | |
| 6,467,280 | B1 | 10/2002 | Pham et al. | |
| 6,470,697 | B1 | 10/2002 | Nakamura et al. | |
| 6,499,305 | B1 | 12/2002 | Pham et al. | |
| 6,574,982 | B1 | 6/2003 | Wiseman et al. | |
| 6,601,396 | B1 | 8/2003 | Bair, III et al. | |
| 6,612,116 | B1 | 9/2003 | Fu et al. | |
| 6,622,503 | B1 | 9/2003 | Bennett et al. | |
| 6,658,878 | B1 * | 12/2003 | Shim et al. | 62/229 |
| 6,662,578 | B1 | 12/2003 | Pham et al. | |
| 6,662,583 | B1 | 12/2003 | Pham et al. | |
| 6,679,072 | B1 | 1/2004 | Pham et al. | |

* cited by examiner

REFRIGERATED COMPARTMENT WITH CONTROLLER TO PLACE REFRIGERATION SYSTEM IN SLEEP-MODE

BACKGROUND OF THE INVENTION

The present invention relates generally to a refrigerated compartment including a controller that places a refrigeration system in a sleep-mode for a predetermined amount of time in response to a signal.

Restaurants, kitchens and food preparation areas commonly include a cooler or freezer having a refrigerated compartment in which perishable items and food, such as vegetables, meats, and dairy products, are stored. The refrigerated compartment is cooled by a remote refrigeration system. The refrigerated compartment is continuously accessed for cleaning, to retrieve food, and to store food.

During replenishment of the refrigerated compartment, warm air can enter the refrigerated compartment, possibly exposing the food to temperatures above the safe limits set by the governing food safety bodies (such as the Food and Drug Administration) and causing spoilage. During replenishment, the refrigeration system continues to operate to maintain the temperature in the refrigerated compartment.

Most local and national codes require that the evaporators in the refrigerated compartment have an electrical disconnect switch that allow the evaporator fan to be turned off when the evaporators are serviced for extended periods of time. The main power to the refrigeration system can also be turned off. For example, the refrigeration system is commonly turned off during cleaning to prevent water from freezing on the evaporator.

Employees occasionally turn off the evaporator fan and the refrigeration system to prevent cold air from blowing on them when stocking items in the refrigerated compartment. In certain applications, the refrigeration system is independent of the evaporator fan, and the employee may not have access to the electrical disconnect for the refrigeration system when the power to the evaporator fan is turned off.

When the evaporator fan and the refrigeration system are off, the temperature in the refrigerated compartment increases. If the employee forgets to activate the refrigeration system and the evaporator fan after leaving the refrigerated compartment, the temperature in the refrigerated compartment continues to increases, possibly putting the food at risk of spoiling.

In prior refrigerated compartments, the disconnect switch to the evaporator fan is not always wired correctly and may not allow the normally closed liquid line solenoid valve to close. This can cause slugs of liquid refrigerant to flood the compressor, possibly causing compressor failure and a complete shutdown of the refrigeration system. By the time the compressor failure is detected, the temperature of the refrigerated compartment can increase. Incorrectly shutting down the refrigeration system and restoring operation, or leaving the refrigeration system off for an extended period of time, also causes heavy power or demand use of kilowatts (kW) during the pull down mode.

There is a need for a refrigerated compartment that enters a sleep-mode and blows cool air into the refrigerated compartment after a predetermined amount of time and overcomes the other disadvantages of the prior art.

SUMMARY OF THE INVENTION

A refrigeration system is employed to cool a refrigerated compartment in a restaurant or kitchen. Refrigerant is compressed in a compressor to a high pressure and a high enthalpy. The compressed refrigerant is cooled in a condenser and expanded to a low pressure in an expansion device. The refrigerant then flows through an evaporator and cools the air in the refrigerated compartment. The refrigerant then returns to the compressor, completing the cycle. The refrigeration compartment includes an electronic refrigeration controller that controls various aspects of the refrigerated compartment, including the temperature.

When an employee stocks or removes inventory from the refrigerated compartment, the employee presses a push button to place the refrigeration system in a sleep-mode. The refrigeration system is safely shut down and the evaporator is turned off to stop cool air from blowing into the refrigerated compartment and on the employee. After a predetermined amount of time, the sleep-mode ends and the refrigeration system and the evaporator fan is activated to cool the refrigerated compartment, ensuring that the temperature of the refrigerated compartment does not elevate above a critical temperature for an extended period of time.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
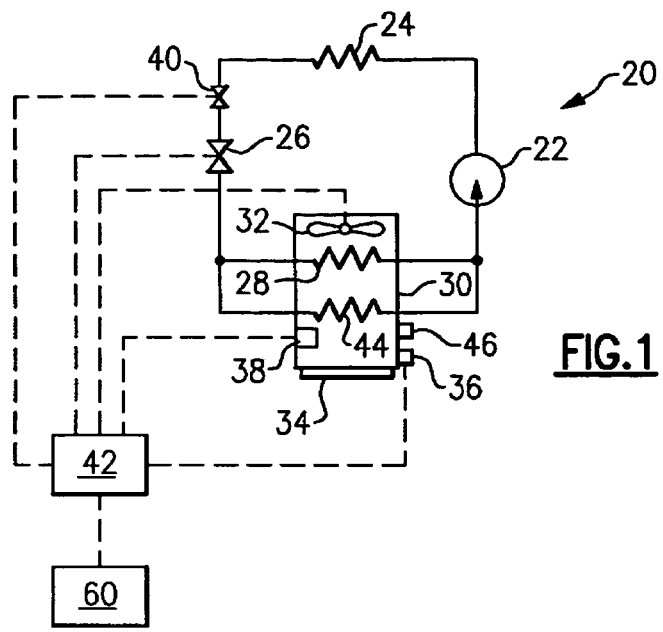
FIG. 1 schematically illustrates a refrigeration system utilized to cool a refrigerated compartment of the present invention.

As schematically illustrated in FIG. 1, a refrigeration system 20 is employed to cool a refrigerated compartment 30. The refrigerated compartment 30 can be a freezer or a refrigerator in a kitchen or restaurant that cools and stores perishable items, such as food. However, it is to be understood that other uses are possible. For example, the refrigerated compartment 30 can be a display case or a service cabinet that stores items in a preparation area before use. Alternately, the refrigerated compartment 30 can be used for scientific or medical applications.

Refrigerant is compressed in a compressor 22 to a high pressure and a high enthalpy. The compressed refrigerant then flows through a condenser 24 and is cooled. The high pressure and low enthalpy refrigerant is then expanded to a low pressure in an expansion device 26. The expansion device 26 can be an electronic expansion valve, or any other type of expansion device. After expansion, the refrigerant flows through an evaporator 28 and accepts heat from the air in the refrigerated compartment 30. An evaporator fan 32 blows a fluid over the evaporator 28, and the fluid rejects heat to the refrigerant in the evaporator 28, heating the refrigerant and cooling the fluid in the refrigerated compartment 30. In one example, the fluid is air. The refrigeration system 20 can also include more than one evaporator 28 and 44 (i.e., master-slave). If more than one evaporator 28 is employed, the evaporators 28 and 44 can operate independently and at different times. That is, one evaporator 28 can be operating when the other evaporator 44 is not operating. The refrigerant then returns to the compressor 22, completing the cycle. The evaporator fan 32 circulates the fluid in the refrigerated compartment 30 separately from the refrigeration system 20. Therefore, the evaporator fan 32 can operate when the refrigeration system 20 is not operating. The fluid can also circulate by natural convection.

In one example, the refrigerated compartment 30 includes a door 34 that allows access to the refrigerated compartment 30. When food is to be added to or removed from the refrigerated compartment 30, the door 34 is opened to allow access to the refrigerated compartment 30. However, it is possible that the refrigerated compartment 30 does not include a door 34, such as if the refrigerated compartment 30 is a display case.

The refrigeration system 20 includes an electronic refrigeration controller 42 having a timed circuit feature. The electronic refrigeration controller 42 controls various aspects of the refrigerated compartment 30, including the temperature. A push button 36 is located either near the evaporator 28 or near the entrance to the refrigerated compartment 30. Although one push button 36 is illustrated and described, it is to be understood that more than one push button 36 and 46 can be employed. Preferably, the push button 36 is incorporated into an existing Guardian electronic refrigeration control by Parker-Hannifinn.

When an employee stocks or removes food from the refrigerated compartment 30, the employee pushes the push button 36 to stop cool air from blowing into the refrigerated compartment 30. When the push button 36 is pressed, a "sleep-mode" is activated through the electronic refrigeration controller 42 to stop cool air from blowing into the refrigerated compartment 30.

The refrigeration system 20 is safely shut down for a predetermined amount of time when the sleep-mode is activated. A solenoid valve 40 is located between the condenser 24 and the expansion valve 26. When the sleep-mode is activated, the controller 42 provides a signal to close the solenoid valve 40 and the expansion device 26, decreasing the suction pressure of the refrigerant entering the compressor 22. The compressor 22 shuts off by a low-pressure switch. The refrigerant is then pumped out of the low-side of the refrigeration system 20, preventing flooding of the compressor 22 when the refrigeration system 20 is turned on again. Although a solenoid valve 40 is illustrated and described, it is to be understood that the refrigeration system 20 can be safely shut down without a solenoid valve 40. In this example, the refrigeration system 20 is safely shut down by closing the expansion device 26. In the present invention, the refrigeration system 20 is safely shut down and restarted under low load, providing an energy savings.

The evaporator fan 32 is also turned off when the sleep-mode is activated to stop cool air from blowing into the refrigerated compartment 30. Preferably, both the evaporator fan 32 and the refrigeration system 20 are shut down simultaneously to stop cool air from blowing in the refrigerated compartment 30. However, it is to be understood that the evaporator fan 32 and the refrigeration system 20 can be shut down independently to stop cool air from blowing into the refrigerated compartment 30.

After the predetermined amount of time, the sleep-mode ends and the refrigerated compartment 30 is again cooled, ensuring that the refrigerated compartment 30 does not elevate above a critical temperature. The controller 42 sends a signal to open the solenoid valve 40 and the expansion valve 26, starting the refrigeration system 20. The controller 42 energizes and opens the solenoid valve 40, allowing refrigerant to enter the compressor 22. Because the refrigeration was pumped out of the low side of the refrigeration system 20 when the solenoid valve 40 and the expansion valve 26 were closed, the refrigerant does not flood the compressor 22. The controller 42 also activates the evaporator fan 32 to again blowing cool air over the evaporator 28 and into the refrigerated compartment 30.

Operators of the kitchen or restaurant can program the duration of the sleep-mode into the electronic refrigeration controller 42. Alternately, the duration of the sleep-mode can be programmed when the electronic refrigeration controller 42 is manufactured. The duration can be programmed on site at the kitchen or restaurant or remotely by a remote monitoring device 60. In one example, the duration of the sleep-mode is between 5 minutes and 120 minutes. For example, if the refrigerated compartment 30 is employed in a restaurant or kitchen and usually turned off during cleaning or replenishment, the sleep-mode can be programmed to be between 15 minutes and 30 minutes in duration. The sleep-mode can have a longer duration, such as between 8 hours and 48 hours, for example if the sleep-mode is to occur over a weekend. It is to be understood that the sleep-mode can have other durations depending on the application.

By properly shutting down the refrigeration system 20 and the evaporator fan 32, the average kilowatt demand of the equipment in the refrigeration system 20 is kept low. By keeping the kilowatt demand low, the surface temperature of the items in the refrigerated compartment 30 can be kept low.

Figure 2:
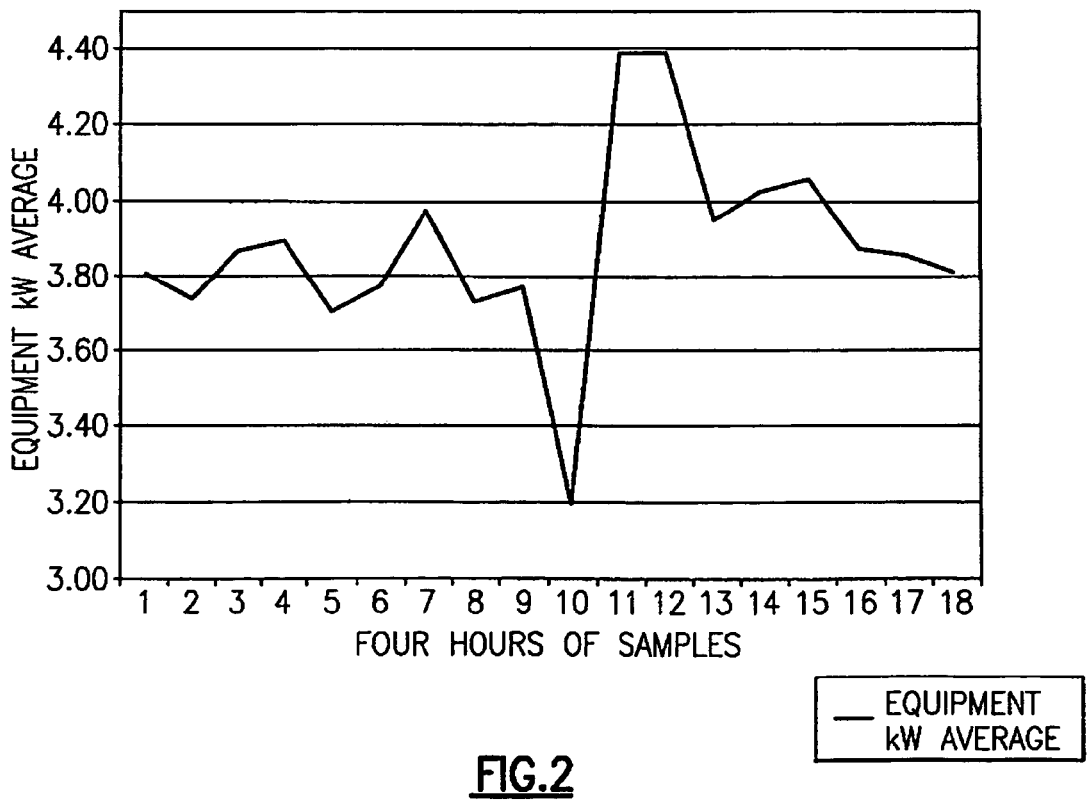
FIG. 2 schematically illustrates a graph showing the effect of improperly shutting down and starting up a refrigeration system with regard to the average kilowatt demand of equipment as a function of time.
Figure 3:
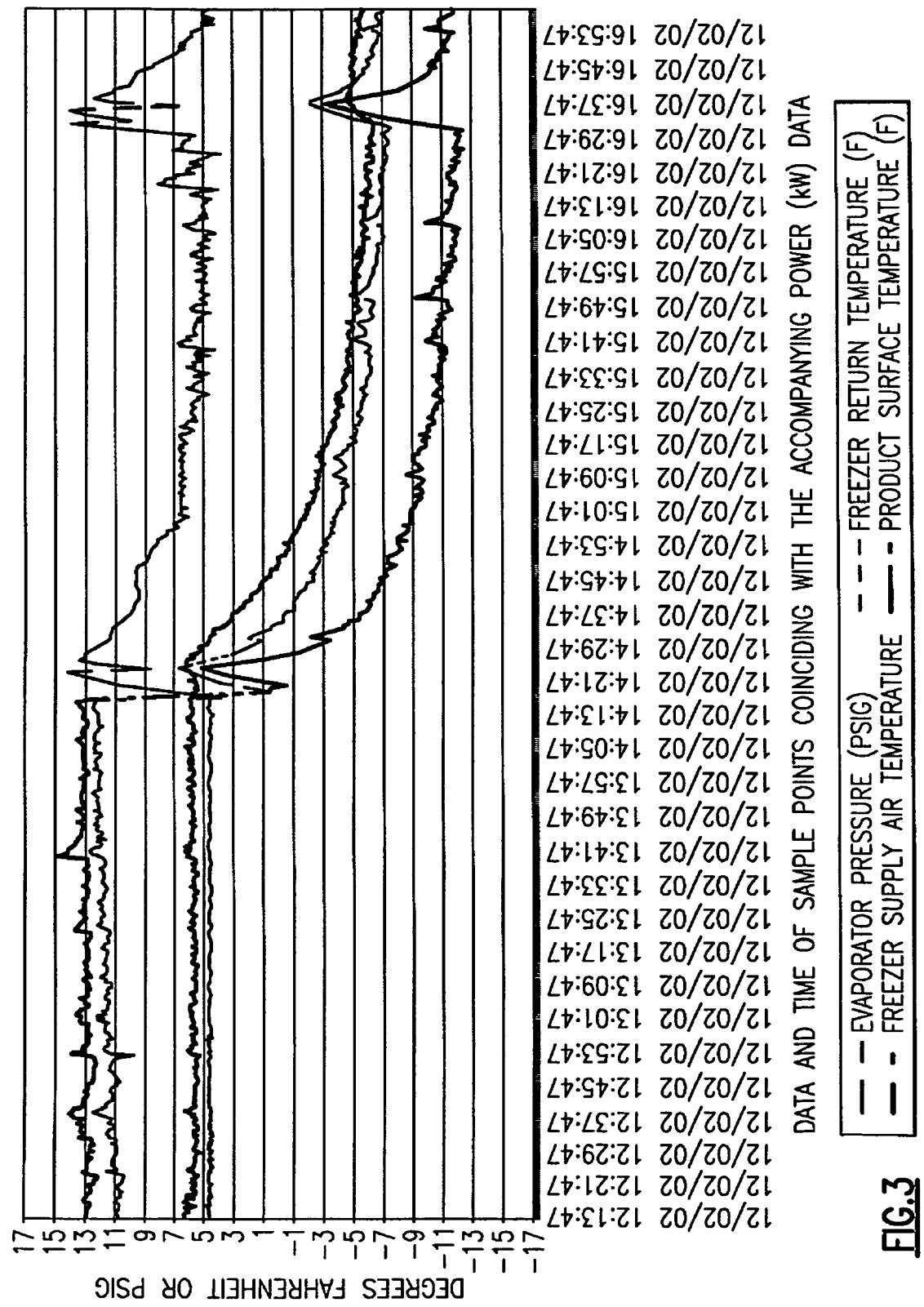
FIG. 3 schematically illustrates a graph showing the effect of improperly shutting down and starting up a refrigeration system with regarding to the temperature of the inventory as a function of time.
Figure 4:
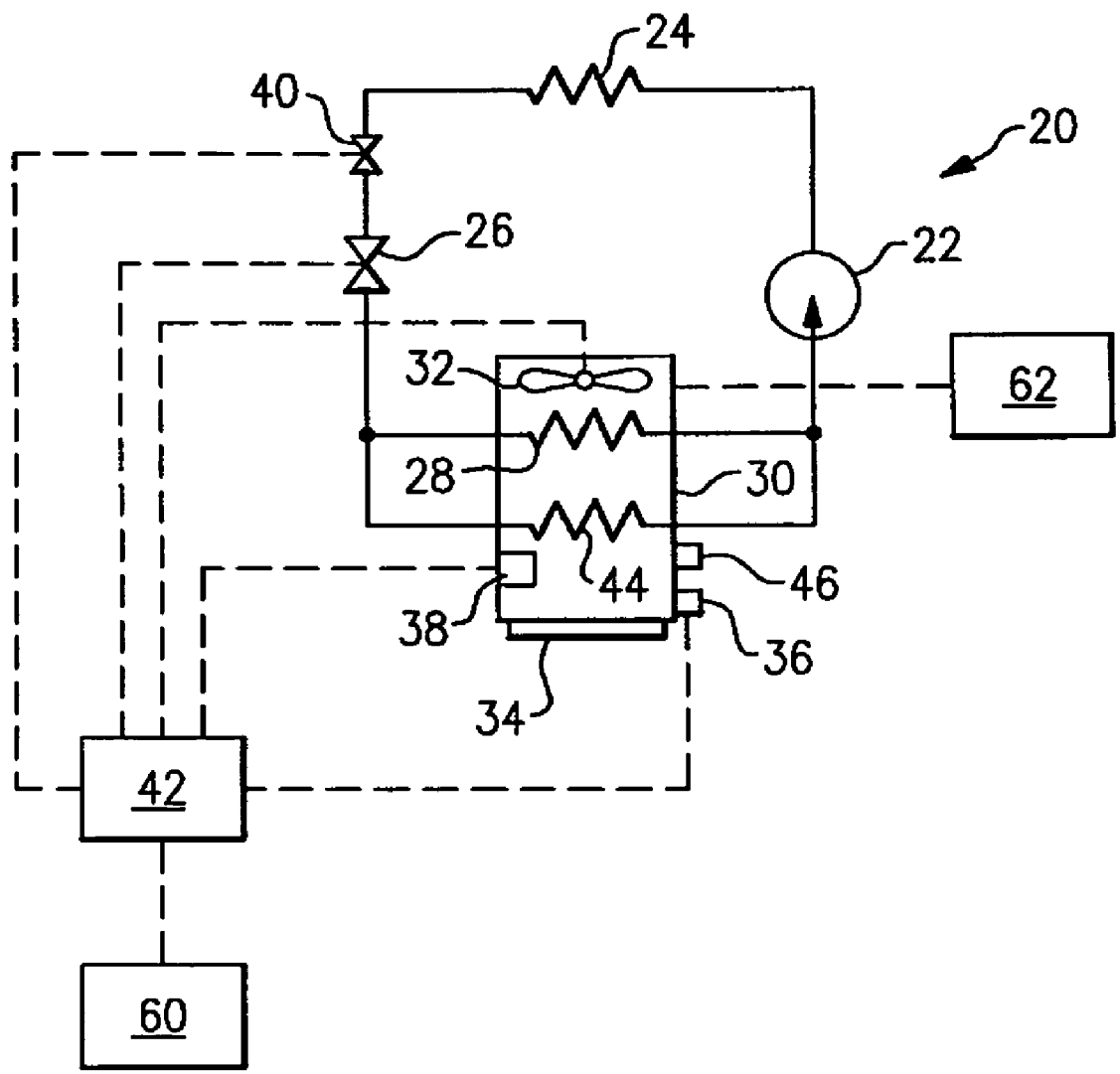
FIG. 4 schematically illustrates a refrigeration system utilized to cool a refrigerated compartment used with scientific or medical applications.

FIG. 2 schematically illustrates the effect of improperly shutting down and starting up the refrigeration system 20 with regard to the average kilowatt demand of the equipment as a function of time over a four-hour time frame. The duration of time between each point is 15 minutes. At point 1, the refrigeration system 20 is improperly shut down. At this time, approximately 3.80 kilowatts is drawn. At point 10, the refrigeration system 20 is turned back on. At point 11, there is a high kilowatt draw because the compressor 22 must pull down the large refrigeration load entering the compressor 22. The average kilowatt draw does not return to the beginning average of 3.80 kilowatts until point 18. That is, the kilowatt draw does not return to the beginning average of 3.80 kilowatts until 1.75 hours after the compressor 22 turns back on. As show in FIG. 3, during this time, the surface temperature of the items in the refrigerated compartment 30 increases. In the present invention, the refrigeration system 20 and the evaporator fan 32 are properly shut down, avoiding a large kilowatt average and preventing the surface temperature of the items in the refrigerated from increasing.

The sleep-mode can be interrupted by again pressing the push button 36. The solenoid valve 40 and the expansion valve 26 open to allow refrigerant to enter the compressor 22. The evaporator fan 32 of the evaporator 28 is also activated to blow cool air into the refrigerated compartment 30. By pressing the push button 36, the sleep-mode ends before the predetermined time.

A programming algorithm limits the number of times that the sleep-mode can be activated in a given time frame. If a person presses the push button 36 after the sleep-mode has ended to again start a sleep-mode, the sleep-mode will not begin again until a temperature sensor 38 detects that the refrigerated compartment 30 has reached a predetermined temperature for a predetermined amount of time. When the temperature sensor 38 detects that the temperature in the refrigerated compartment 30 exceeds the predetermined temperature, the sleep-mode can again be initiated.

Alternately, the electronic refrigeration controller 42 can limit the duration of sequential sleep-modes to ensure that the refrigerated space 30 is not left without refrigeration for too long. The number of times that sleep-mode can be initiated in a given time frame can also be limited.

The events relating to the activation of the sleep-mode, the duration of the sleep-mode, and the temperature in the refrigerated compartment 30 are logged and monitored. The time and date associated with these events are also logged. This information can be accessed on site or remotely.

The foregoing description is only exemplary of the principles of the invention. One skilled in the art would understand that many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of maintaining a temperature in a refrigerated compartment, the method comprising the steps of:
   cooling the refrigerated compartment;
   detecting the temperature in the refrigerated compartment;
   providing a user generated signal to stop the step of cooling for a predetermined amount of time;
   stopping the step of cooling in response to the user generated signal if the temperature in the refrigerated compartment is at or below a predetermined temperature; and
   resuming the step of cooling the refrigerated compartment after the predetermined amount of time.

2. The method as recited in claim 1 further including the steps of:
   compressing a refrigerant to a high pressure;
   cooling the refrigerant;
   expanding the refrigerant to a low pressure; and
   heating the refrigerant, wherein the step of heating the refrigerant includes accepting heat from a fluid medium to cool the refrigerated compartment.

3. The method as recited in claim 2 wherein the step of heating includes employing a first evaporator and a second evaporator.

4. The method as recited in claim 3 further including the step of operating the first evaporator and the second evaporator independently.

5. The method as recited in claim 1 wherein the step of providing the user generated signal comprises pressing a button.

6. The method as recited in claim 1 wherein the predetermined amount of time is between 5 minutes and 120 minutes.

7. The method as recited in claim 6 wherein the predetermined amount of time is between 15 minutes and 30 minutes.

8. The method as recited in claim 1 wherein the predetermined amount of time is between 8 hours and 48 hours.

9. The method as recited in claim 1 wherein the refrigerated compartment is one of a display case and a service cabinet.

10. The method as recited in claim 1 wherein the refrigerated compartment is employed with medical and scientific applications.

11. The method as recited in claim 1 further including the step of providing a user generated second signal to begin cooling the refrigerated compartment before the predetermined amount of time has passed.

12. The method as recited in claim 1 wherein the method is monitored remotely.

13. The method as recited in claim 1 wherein the step of stopping the step of cooling occurs when the temperature in the refrigerated compartment is at or below the predetermined temperature for a programmed amount of time.

14. The method as recited in claim 1, wherein the refrigerated compartment is accessible by a door, and the step of providing the user generated signal occurs when the door is to be opened to access the refrigerated compartment.

15. A system for maintaining a temperature in a refrigerated compartment, the system comprising:
   a controller to regulate the temperature in the refrigerated compartment;
   a temperature sensor to detect the temperature in the refrigerated compartment; and
   an evaporator to cool the refrigerated compartment, wherein the evaporator stops cooling the refrigerated compartment for a predetermined amount of time in response to a user generated signal and if the sensor detects that the temperature in the refrigerated container is at or below predetermined temperature.

16. The system as recited in claim 15 further including:
   a compressor to compress a refrigerant to a high pressures,
   a condenser for cooling the refrigerant, and
   an expansion device to expand the refrigerant to a low pressure.

17. The system as recited in claim 16 further including a solenoid valve located between the condenser and the expansion device, wherein the user generated signal closes the solenoid valve.

18. The system as recited in claim 15 wherein the evaporator heats a refrigerant by accepting heat from a fluid medium, and the fluid medium cools the refrigerated compartment.

19. The system as recited in claim 15 further comprising a button to generate the user generated signal.

20. The system as recited in claim 15 further comprising a a plurality of buttons to generate the user generated signal.

21. The system as recited in claim 15 wherein the predetermined amount of time is between 15 minutes and 30 minutes.

22. The system as recited in claim 15 further including a second evaporator.

23. The system as recited in claim 15 wherein the evaporator stops cooling the refrigerated container when the temperature in the refrigerated compartment is at or below the predetermined temperature for a programmed amount of time.

24. The system as recited in claim 15 further including an evaporator fan that blows air over the evaporator, wherein the user generated signal inactivates the evaporator fan.

25. The system as recited in claim 15, further including a door, wherein the refrigerated compartment is accessible by the door, and the user generated signal is generated when the door is to be opened to access the refrigerated compartment.

* * * * *

UNITED STATES PATENT AND TRADEMARK OFFICE
CERTIFICATE OF CORRECTION

PATENT NO.        : 7,152,415 B2
APPLICATION NO. : 10/803766
DATED             : December 26, 2006
INVENTOR(S)       : Micak et al.

It is certified that error appears in the above-identified patent and that said Letters Patent is hereby corrected as shown below:

Column 6, lines 40-41 : "pressures" should be --pressure--

Column 6, line 57: Delete the second occurrence of "a"

Signed and Sealed this

Thirteenth Day of March, 2007

JON W. DUDAS
*Director of the United States Patent and Trademark Office*